United States Patent [19]

Kelly

[11] 4,414,885
[45] Nov. 15, 1983

[54] FLAVOR INJECTOR

[76] Inventor: Harry C. Kelly, 4225 Colorado Ave., N.W., Washington, D.C. 20005

[21] Appl. No.: 393,410

[22] Filed: Jun. 29, 1982

[51] Int. Cl.³ ............................ A23B 4/02; A23L 1/22
[52] U.S. Cl. ...................................... 99/494; 99/532; 111/92
[58] Field of Search ................ 99/345, 419, 494, 516, 99/532–535, 450.7, 450.8; 17/25, 30, 42.1; 111/92; 128/218 R, 218 P, 218 PA, 218 N; 30/123.3, 128; 222/386, 510

[56] References Cited

U.S. PATENT DOCUMENTS

| | | | |
|---|---|---|---|
| 774,394 | 11/1904 | Peter | 99/494 |
| 2,887,035 | 5/1959 | De Seversky | 99/532 |
| 4,178,660 | 12/1979 | Olney et al. | 99/532 X |
| 4,182,002 | 1/1980 | Holec | 99/532 X |
| 4,211,160 | 7/1980 | Bieser | 99/532 X |

Primary Examiner—Timothy F. Simone
Attorney, Agent, or Firm—Sherman Levy

[57] ABSTRACT

A method and apparatus for introducing and distributing additives into bodies of meat and the like. The apparatus includes a cylindrical member retained in a hollow cylindrical tubular member, the tubular member engaging with an additive reservoir. The cylindrical member performs as a plunger to dispense additives from the reservoir into the hollow cylinder which in turn are projected by the plunger into the meat or the like. The free end of the hollow cylinder is applied or inserted into meat or the like being cooked for consumption. The reservoir also contains a plunger.

1 Claim, 6 Drawing Figures

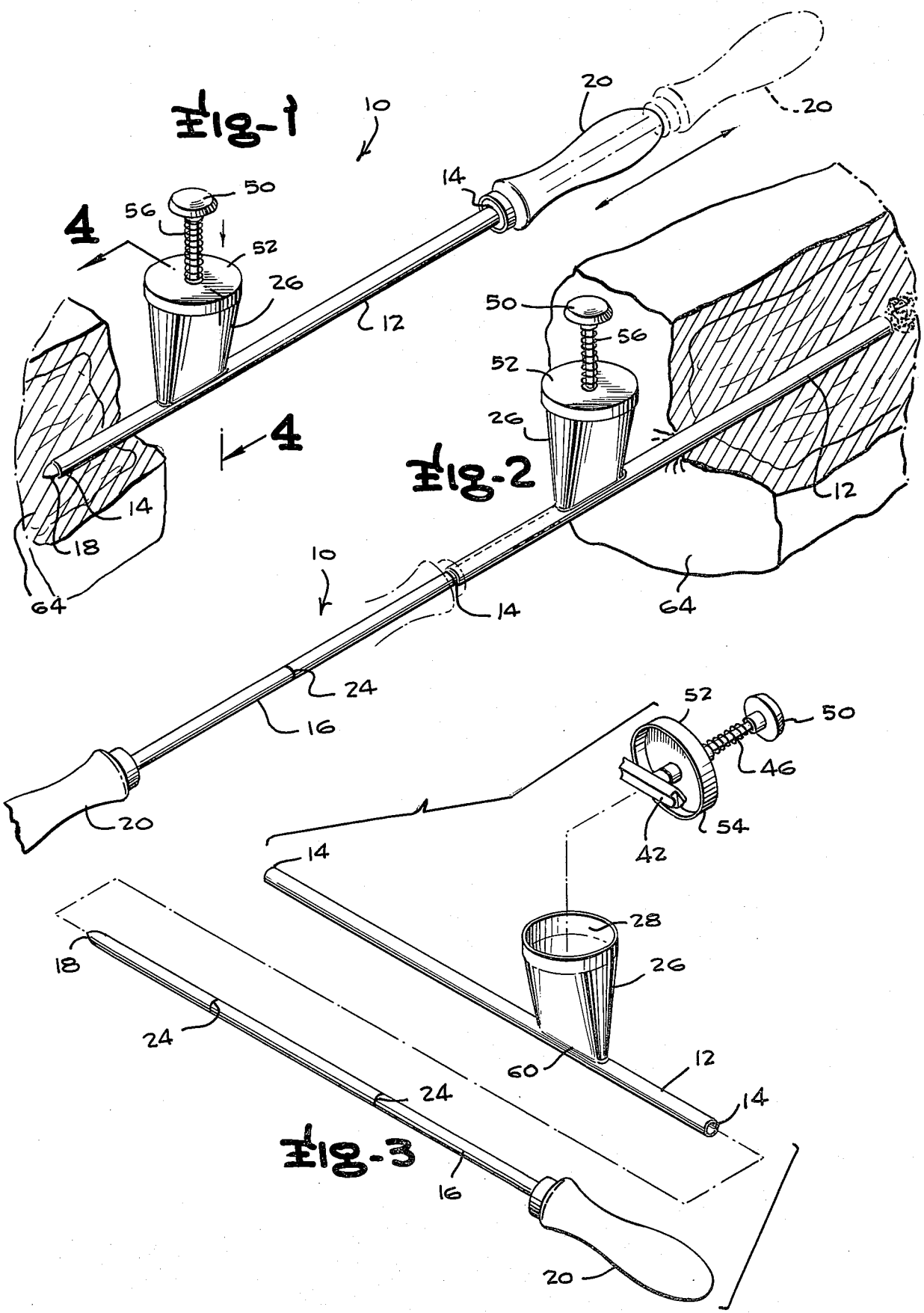

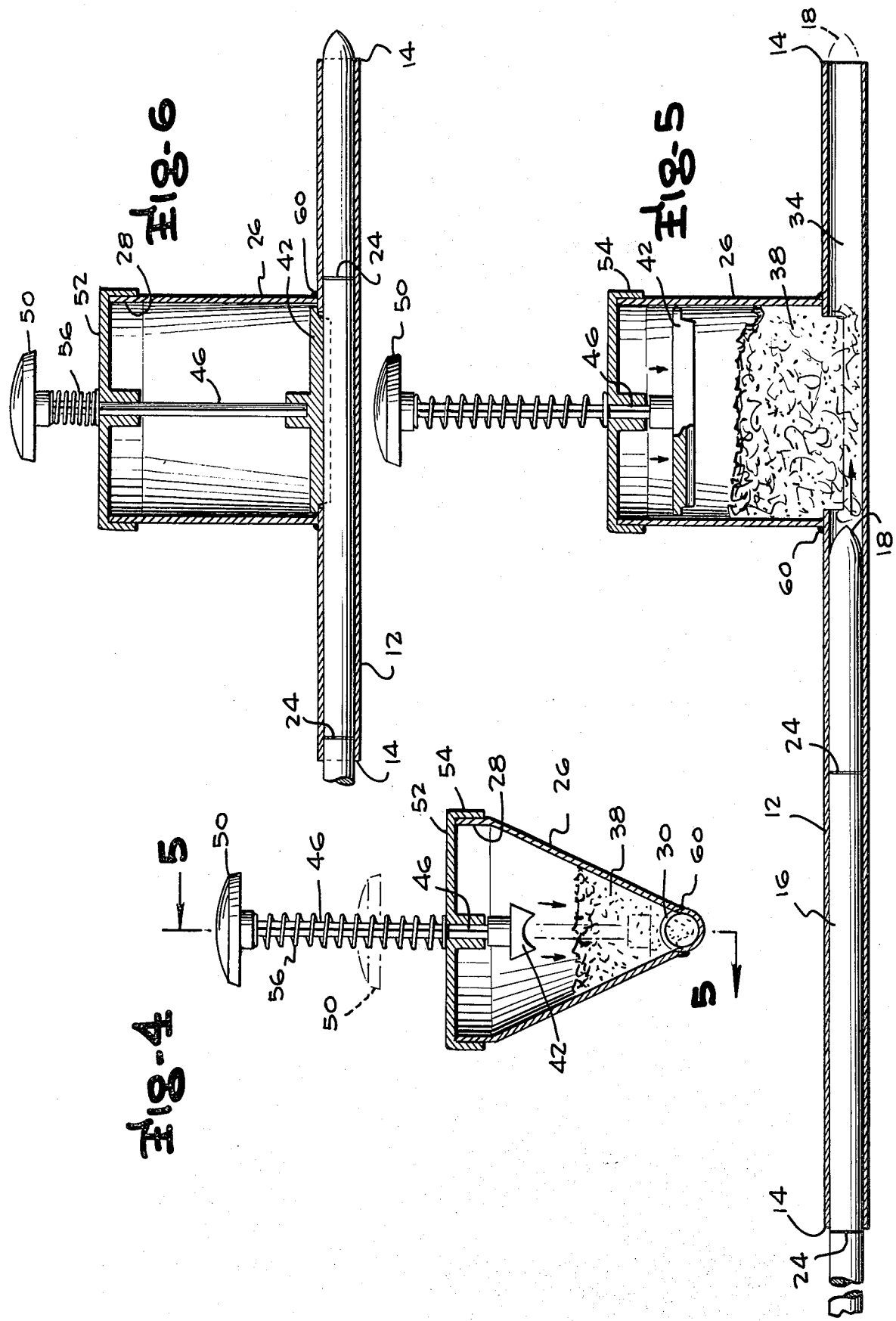

FLAVOR INJECTOR

BACKGROUND OF THE INVENTION

The present invention relates to a new and improved food seasoning apparatus and methods and more particularly, the invention relates to a device for injecting internally of a meat body and the like a liquid, condiments, food additives or compositions or solid seasonings into the body or prior to cooling, or during one or more intervening stages of cooking. The apparatus and device of the invention is particularly adaptable to turkeys, ham, roasts and chickens, and in which it is desirable to inject spices, condiments and other selected food compositions so that the resulting body when ready for consumption is desirably treated with spices, food additives, food processing mixtures and compositions. The invention comprises an embodiment of the apparatus involving exerting direct pressure on an elongated injecting rod that projects or prompts, in a manner of speaking, a desired volume of additives or food composition into the consumable body that is to be seasoned or processed. The projecting rod is withdrawn from the consumable body rearwardly by pulling on a handle at the other end until the free hand of the projecting rod is drawn beyond a container or reservoir that stores the additives or seasonings that are to be projected into the consumable body. At that point, the reservoir fills the hollow tubing and if the material or seasoning in the reservoir does not readily fill the hollow tube, a plunger is depressed from a cover of the reservoir augmenting the disposition of seasoning materials into the hollow tube. The hollow tube is then ready for receiving the projecting rod and thus the consumable body is again ready to receive a specified volume of seasoning material.

The invention thus relates to a flavor injector for consumable bodies and serving to inject additives and seasonings into meat or similiar consumable bodies for purposes of augmenting the taste, cooking, and processing the body for consumption.

Conventionally, seasonings, tenderizers and preservatives and similar additives in granular or powdered form are sprinkled over food, such as meat, turkey and chicken, or fluid substances are used, but the substances do not penetrate the food body sufficiently to produce a desired uniform effect throughout the consumable body. While the consumable body is sometimes pierced with a fork or even pounded, these methods leave much to be desired in the results obtained, and it has been found that spices, seasonings, flavoring compounds and preservative fluids or the like can be injected easily into a consumable body such as meat and this can be accomplished either during cooking or prior to the cooking process.

DESCRIPTION OF THE PRIOR ART

Various prior art devices and methods are known of interest cursorily to the present invention and include U.S. patents as follows:

| | |
|---|---|
| 3,082,681 | F. H. Peterson |
| 3,241,477 | M. Jenner |
| 3,410,457 | C. A. Brown |
| 3,483,810 | M. J. Peters, et al |
| 3,530,785 | M. J. Peters, et al |
| 4,178,660 | A. A. Oleny, et al |
| 4,211,160 | D. W. D. Biaser |

None of these patents disclose all of the specific details of the present invention in such a way as to bear upon the patentability of the claims of the invention.

SUMMARY OF THE INVENTION

An object and advantage of the present invention is to provide a new and improved method, device, and apparatus which can be readily used to introduce a desirable flavoring, tenderizing or preservative compound or fluid into a food, meat, or other consumable body, whether fish or fowl.

Another object of the invention is to provide a device having a hollow probe or tube through which a material is injected into a food body in specified and determinable volumetric amounts and in which the injection can be selected so that the seasonings are added to a portion of the consumable body.

Still another object of the invention is to provide a device of the type indicated in which it is capable of adjustment to regulate the amount of fluid or seasoning material that will be discharged upon the operation of the device according to the invention.

A further object and advantage of the present invention is to provide a flavor injector wherein an amount of condiment or seasoning can be discharged readily in ascertainable volumetric amounts according to a predetermined indicia or marks disposed on the projecting rod.

Another and still additional object of the invention is to provide a device that can be readily disassembled sufficiently and easily for cleaning, washing, and that can then be reassembled quickly and easily for use prior to or during any stages of cooking of the consumable body.

It is a further object of the present invention to provide a device for injecting solid or liquid seasoning into the interior of food, particularly meat products.

Other objects of the invention are to provide a flavor injector which is relatively inexpensive to manufacture and sell and wherein there is provided a novel and improved construction and arrangement of parts.

These, together with other objects and advantages which will become subsequently apparent reside in the details of construction and operation as more fully hereinafter described and claimed, reference being had to the accompanying drawings forming a part hereof and wherein like numerals refer to like parts throughout.

BRIEF DESCRIPTION OF THE SEVERAL VIEWS OF THE DRAWINGS

FIG. 1 is a front perspective view of the flavor injector according to a preferred embodiment of the invention when in use for seasoning an article of food.

FIG. 2 is another perspective view of the flavor injector in which a longer portion of a hollow tube is injected into an article of food and the like.

FIG. 3 is a composite and exploded perspective view of the various components forming the flavor injector of the present invention.

FIG. 4 is a sectional view taken along lines 4—4 of FIG. 1.

FIG. 5 is a sectional view taken along lines 5—5 of FIG. 4.

FIG. 6 is a sectional view corresponding partially to FIG. 5 but wherein the plunger in the container is fully depressed according to one use of the invention.

DETAILED DESCRIPTION OF THE PREFERRED EMBODIMENT

Referring now to the drawings, there is shown a flavor injector device 10 having a hollow tube 12 with open ends 14 and being generally cylindrical throughout the hollow portion from one end 14 to the other end 14, a projecting rod 16 generally cylindrical formation throughout and being telescopically engageable with the interior of the hollow tube 12 in a piston-cylinder relationship. The projecting rod 16 has a point or piercing element 18 at the free end of the rod 16, and a hand grasping member or handle 20 at the other which is securely and stably held in fixed relation with the rod 16. Along predetermined, measured increments of the surface of the rod 16 are identifying indicia or marks 24 that provide indications of volume displacement as the indicia 24 passes an end 14.

Intermediate the ends 14 of the hollow tube 12 there is a hollow container 26 having a generally circular top portion 28 interior of the reservoir 26 while the other end of the reservoir 26 forms an elongated slot 30 that is stably secured to an intermediate portion of the tube 12 and is in communication with the interior hollow portion 34 thereof so that contents, additives or seasonings that are disposed within the hollow container 26 are dispensed through the slot 30 into the hollow portion 34, such as is shown in FIGS. 4–6. The seasonings 38 are in the container 26 and either freely communicate into the hollow portion of the tube, or a semi-cylindrical plunger 42 as an outer portion 44 of the semi-cylindrical plunger 42 coupled to an axially extending shaft 46 terminating at its other end with a handle 50 is used for forcing the material down into the tube. The container 26 is provided about its circular opening 28 with a cover 52 having a lip portion 54 for engaging the peripheral portion of the circular opening 28 and for closing off the receptacle 26. Within the purview of the invention the cover 52 may contain a grill surface or apperatures for allowing the user to observe the quantity of seasoning 38 within the container 26, and the shaft 46 is held in a normally distended position by a helical spring 56 shown in its normal position in FIGS. 4 and 5, but is completely compressed in FIG. 6 so that the semi-cylindrical plunger 42 is positioned to fill the slot at the bottom of the container 26 and so that the seasoning 38 is projected into the hollow portion 34.

The cover 50 may be frictionally secured to the container 26 or a snap, fastener, semi-turned screw surface or the like may be provided that secures the lip 54 onto the peripheral portion of the circular opening 28, in a well known manner. The bottom of the reservoir 26 is held by a weld joint 60 to the hollow tube 12.

Before the flavor injector is inserted into a consumable body or meat 64, the piercing element 18 together with the hollow tube 12 are in proximity at the proximate edge 14 and are thrust or pierced into the meat or other food producer 64. After this has been accomplished, as shown in each of FIGS. 1 and 2, then the projecting rod 16 is withdrawn while the hollow tube 12 is maintained in place or position within the meat 64 and the rod is withdrawn sufficiently so it has the piercing element 18 to traverse the slot at the bottom of the container 26, whereupon material, condiments, and seasonings 38, as described above, disposed within the container 26 are allowed to drop into the hollow portion 34. The projecting rod can be slid axially past the slot 30 so that the seasonings 38 pass along the hollow portion 34 of the tube 12 and thence into the food product 64. After a specified volume, as, for example, shown by indicia as marks 24 has been injected into the food product 64, additional seasonings 38 may be applied by withdrawing the projecting rod 16 again past the slot communicating between the container 36 and the hollow portion 34 for a refill accordingly. Then the projecting rod 16 is again telescopically and axially advanced along the hollow tube 12 until the desired volumetric measure of seasoning 38 is filled and packed within the food product 64.

Where an amount of seasoning is to be desired and projected within a near portion of the meat respecting the surface of the meat, the apparatus and device forming the flavor injector 10 is arranged as shown in FIG. 1, but where it is selected to project the seasonings 38 further into the meat or other food products 64, the flavor injector is arranged as shown in FIG. 2 accordingly. Thus, it is apparent that the container 26 is held in securement by welding 60 along an intermediate portion of the hollow tube 12 nearer one end 14 than the other. This provides that since seasoning 38 will fill the small end of the hollow tube 12, as shown in FIG. 1, a small injection of seasoning is availed such as injecting sage or other strong or sensitive seasonings and the like, and the rod 16 is inserted reversely into the hollow tube 12 shown in FIG. 2 when it is desired to use a larger volume of seasonings 38 to be injected into the meat 64. The rod is pushed, as described above, on its way in and with a sharp point or piercing element 18 so that it becomes the functioning unit in the initial injection of the hollow tube 12 into the meat 64. Then, as described above, the rod is withdrawn so that one can observe the mark or indicia 24 and the seasoning is allowed to fill the hollow portion 34 and by pushing or shoving the rod 16 in, the seasoning is injected into the meat 64 until the desired number of indicia marks pass one of the respective ends 14 so that the selected and desired volumetric measure of seasoning 38 is injected into the meat. The unique structure of the flavor injector is that the flavor injector 10 performs as a short or long or deep and shallow seasoning injector, and the steps of operating the flavor injector 10 can be repeatively performed for injecting seasonings into the meat.

The handle 20 may perform as a stop where it impacts against the proximate end 14 of the tube 12 as shown in FIG. 1.

The container 26 may have a transverse cross-section that is triangular in shape, or the container 26 may have a cone shape so that seasoning 38 funnels down into the hollow portion 38 of the tube 12. By using a container of a triangular shape, the semi-cylindrical plunger 42 can be depressed only when the plunger 42 is in parallel alignment with the tube 12 and this provides maximum agility in allowing the seasoning to be inserted or injected within the hollow portion 34 of the tube 12.

The invention of the flavor injector provides food flavor of a consumable product or meats or similar food to the desire of the user of the flavor injector device. Any kind of flavor material or seasoning can be used in the device, and it may also be used for flavoring fruits, mellons, and consumable food products that are to be broiled, baked, roasted, or used by cooking in a microwave oven. The flavoring is done by injecting the flavor as a particulate solid or a liquid into the cooked or partially uncooked food, and this is an easy, uncomplicated method of preparing unique food products. It is intended that the flavor injector can use, whether chopped, crushed or otherwise particulated, crushed pineapple, chopped food, nuts, chopped shrimp, powdered seasonings, and any liquids or jellys as desired can be inserted into the reservoir or container of the flavor injector. The parts can be made of any suitable material and in different shapes or sizes as desired or required.

The following is given as a specific example of the use of the present invention. First, the reservoir 26 is filled with material that is to be injected into the food product 64. Then the rod 16 is inserted into the tube 12 and this construction prevents clogging of the tube. Next, both the tube and the rod are inserted into the food product 64 with the pointed end 18 providing a piercing point, and the tube and rod are inserted into the food product the desired distance. The injector rod 16 is then pulled back to an indicia mark, just past the reservoir, and this allows the flavor to enter the tube 12 to be injected into the meat, and the flavor 38 is injected into the meat by pushing the injector rod 16 forward to the other mark 24, and this process can be repeated at different points in the meat. Or, the injection can be moved to different areas from the same injection point, or you can move the injector to different angular positions.

It is to be understood that the present invention is not limited to any specific material or flavor and for example, the material to be injected can be pasty, solid or of any type or consistency. In FIG. 2 it is to be understood that the numeral 64 only indicates a portion of the meat or food product and the length or size thereof can be of any desired dimension.

The foregoing is considered as illustrative only of the principles of the invention. Further, since numerous modifications and changes will readily occur to those skilled in the art, it is not desired to limit the invention to the exact instruction and operation shown and described, and accordingly, all suitable modifications and equivalences may be resorted to, falling within the scope of the invention.

What is claimed and desired to be secured by Letters Patents is:

1. In a flavor injector device for introducing a composition or additive internally into a body of meat and the like, said device consisting solely of a tube hollow throughout its entire length and having a generally constant diameter, a projecting rod enclosed by the tube in generally telescopic relation thereto, a reservoir mounted perpendicularly and in securement at an intermediate portion of the hollow tube and the interior of the reservoir being in communication with said hollow tube in air tight relation, the reservoir adapted for holding a predetermined quantity of additive or seasoning composition, the projecting rod being displaceable along the hollow tube into insertion relation with said body of meat and the like, and wherein clogging is prevented in said tube by said projecting rod; a cover disposed on the reservoir at a point distal from the communication of the reservoir with the hollow tube; an axially extending shaft mounted plunger slideably mounted on the cover and being spring-biased away from the hollow tube by spring means retained between the cover and a handle on the shaft; said cover having a generally circular configuration throughout; said reservoir being secured onto said hollow tube; the outer surface of the projecting rod containing indicia marks indicative of volume of additives or composition to be inserted into the body of meat and the like, the projecting rod being pointed for piercing a food project, a shaft mounted plunger extending through said cover; the plunger having a generally semi-cylindrical contour for packing and projecting additives or composition into the hollow tube; and said shaft mounted plunger being in slideable engagement with a mounting sleeve, and the sleeve being mounted on a plate secured to the cover.

* * * * *